US012799257B2

(12) United States Patent
Maris et al.

(10) Patent No.: US 12,799,257 B2
(45) Date of Patent: Nov. 17, 2026

(54) BLOCK COPOLYMER COMPOSITION AND METHODS OF PREPARATION THEREOF

(71) Applicant: Kraton Corporation, Houston, TX (US)

(72) Inventors: Catherine A. L. Maris, Brussels (BE); Martine Dupont, Amsterdam (NL); Xavier D.D.J. Muyldermans, Brussels (BE)

(73) Assignee: Kraton Corporation, The Woodlands, TX (US)

( * ) Notice: Subject to any disclaimer, the term of this patent is extended or adjusted under 35 U.S.C. 154(b) by 657 days.

(21) Appl. No.: 18/471,386

(22) Filed: Sep. 21, 2023

(65) Prior Publication Data

US 2024/0141091 A1 May 2, 2024

Related U.S. Application Data

(60) Provisional application No. 63/380,953, filed on Oct. 26, 2022.

(51) Int. Cl.

| | |
|---|---|
| ***C08F 297/04*** | (2006.01) |
| ***C08J 3/24*** | (2006.01) |
| ***C08J 5/18*** | (2006.01) |
| ***C09J 153/02*** | (2006.01) |

(52) U.S. Cl.

CPC ............. *C08F 297/044* (2013.01); *C08J 3/24* (2013.01); *C08J 5/18* (2013.01); *C09J 153/025* (2013.01); *C08J 2353/02* (2013.01)

(58) Field of Classification Search

None

See application file for complete search history.

(56) References Cited

U.S. PATENT DOCUMENTS

| | | | | |
|---|---|---|---|---|
| 7,186,779 | B2 * | 3/2007 | Joly | C08L 53/025 525/914 |
| 7,202,297 | B2 * | 4/2007 | De Keyzer | C08F 297/04 524/505 |
| 7,268,184 | B2 * | 9/2007 | Joly | C08F 297/044 525/88 |
| 7,560,503 | B2 * | 7/2009 | St. Clair | C08F 297/044 525/289 |
| 7,704,676 | B2 * | 4/2010 | Dubois | G03F 7/033 430/287.1 |
| 8,273,821 | B2 * | 9/2012 | Kim | C09J 153/02 524/505 |
| 9,115,296 | B2 * | 8/2015 | Kluttz | C09D 195/005 |
| 10,767,033 | B2 * | 9/2020 | Kluttz | C08L 53/02 |
| 11,447,622 | B2 * | 9/2022 | Raghavendran | C08L 23/10 |
| 12,503,585 | B2 * | 12/2025 | Muyldermans | C08L 53/025 |
| 2003/0187137 | A1 | 10/2003 | Handlin et al. | |
| 2004/0007322 | A1 * | 1/2004 | Lechat | C09J 153/02 156/289 |
| 2007/0092722 | A1 | 4/2007 | Vermunicht et al. | |
| 2009/0163361 | A1 | 6/2009 | Handlin et al. | |
| 2019/0292361 | A1 | 9/2019 | Flood et al. | |

FOREIGN PATENT DOCUMENTS

| | | | | | |
|---|---|---|---|---|---|
| CA | 2989293 | C * | 9/2023 | | C09K 8/035 |
| EP | 1705212 | A1 * | 9/2006 | | C08J 9/32 |
| EP | 1299495 | B1 * | 1/2008 | | C09J 7/387 |
| JP | H07206954 | A * | 8/1995 | | C08G 81/022 |
| WO | WO-2025003495 | A1 * | 1/2025 | | A61K 39/39591 |

* cited by examiner

*Primary Examiner* — Sanza L. McClendon

(57) ABSTRACT

The disclosure relates to a styrenic block copolymer (SBC) having at least a triblock, and a diblock structure with a diblock content of up to 50 wt. %. The SBC is suitable for film applications requiring soft stretch properties even without adding oil, pressure sensitive adhesive applications, photocurable (photopolymerizable) printing plates, etc. Additional components can be added to the SBC, accordingly, forming the end-use (application) composition.

20 Claims, No Drawings

BLOCK COPOLYMER COMPOSITION AND METHODS OF PREPARATION THEREOF

RELATED APPLICATIONS

This application claims priority from U.S. Provisional Application No. 63/380,953 with a filing date of Oct. 26, 2022, the disclosure of which is incorporated herein by reference.

FIELD

The present disclosure relates to a styrenic block copolymer composition with a low polystyrene content and a tailored diblock content, and methods of preparation thereof.

BACKGROUND

Disposable personal hygiene articles such as gloves, diapers and incontinence products are in widespread use. Elastic films are particularly useful for personal hygiene articles and their integral components. These articles have certain property requirements including elasticity, tensile properties, and softness. Styrene-isoprene-styrene block copolymers (S-I-S) and styrene-butadiene-styrene block copolymers (S-B-S) are widely used in these compositions. When softness and low retraction forces are required at low elongations, S-I-S or a combination of S-B-S and S-I-S copolymers are typically used.

S-I-S polymers are preferred polymers for the formulation of styrenic block copolymer (SBC) based pressure sensitive adhesive (PSA) applications because they show low modulus and low hot-melt viscosities. They are easy to formulate with a range of low molecular weight ingredients to develop adhesion on a wide range of substrates. However, S-I-S polymers are susceptible to thermal degradation during processing and preparation.

Commercial S-B-S are difficult to formulate in very tacky adhesives and tend to gel upon ageing. Elastomeric films or adhesives for commercial application are typically melt processed at high temperatures.

There is still a need for elastomeric compositions with improved melt flow, hardness, and tensile properties combined with better odor performance, for use in sustainable formulations for reduced carbon footprint.

SUMMARY

In one aspect, a styrenic block copolymer (SBC) comprising based on the total weight of the styrenic block copolymer, (i) a diblock structure A-B, in an amount of 20-50 wt. %, (ii) a triblock structure selected from A-B-A, A-B-A' in an amount of 40-80 wt. %. Each block A and A' are same or different and each comprises a vinyl aromatic monomer, each A and A' have a molecular weight ranging from 8-12 kg/mol. Polymer block B contains more than 90 wt. % polymerized butadiene monomer and polymer block B has a vinyl content of 5-20 mol %. The SBC has a vinyl aromatic content of 17-28 wt. %. The SBC is characterized as having a melt flow rate of 1-35 g/10 min at 200° C./5 kg according to ASTM D1238 and a Shore A hardness of 35-75 according to ASTM D2240.

In yet another aspect, the styrenic block copolymer further comprises up to 15 wt. % of at least a structure selected from $(A\text{-}B)_n$-X or $(A\text{-}B)_m$-X-$(B\text{-}A')_o$, and mixtures thereof, wherein n and (m+o)≥2 and X is a residue of the coupling agent.

In another aspect, the styrenic block copolymer has the total amount of the diblock and the triblock structure >90 wt. %.

In one aspect, a specimen made from the SBC is characterized as having at least one of a modulus at 100% elongation of 0.5 to 1.8 MPa, an elongation at break >800%, and a tensile strength of >8 MPa, all properties according to ISO 37.

DESCRIPTION

The following terms will be used throughout the specification.

"At least one of [a group such as A, and B]" or "any of [a group such as A and B]" means a single member from the group, more than one member from the group, or a combination of members from the group. For example, at least one of A and B includes, for example, A only, B only, as well as A and B. The list of embodiments presented as "A", "B," is to be interpreted as including the embodiments, A only, B only, "A or B".

"Copolymer" refers to a polymer derived from more than one species of monomer.

"Block copolymer" refers to a copolymer that comprises more than one species of monomer, wherein the monomers are present in blocks. Each block is constituted of a set of monomer units different from the set of monomers of the connected surrounding blocks in the same block copolymer. Each block can be constituted of a homopolymer or a random copolymer.

"Polystyrene content" or PSC of a block copolymer refers to the weight % of polymerized vinyl aromatic units, e.g., styrene in the block copolymer, calculated by dividing the sum of molecular weight of all polymerized vinyl aromatic units by the total molecular weight of the block copolymer. PSC can be determined using any suitable methodology such as proton nuclear magnetic resonance (NMR).

"Vinyl content" of a polymer or a block copolymer refers to the amount of vinyl groups generated when a conjugated diene adds via a 1,2-mechanism, resulting in an olefinic or vinyl group, adjacent to the polymer backbone. The vinyl content can be measured by Nuclear Magnetic Resonance spectroscopy (NMR) and is generally expressed as mol % of the conjugated diene part.

"Molecular weight" or $M_w$ refers to the polystyrene equivalent molecular weight in kg/mol of a polymer block or a block copolymer. $M_w$ can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. $M_w$ of polymers measured using GPC are polystyrene equivalent molecular weights or apparent molecular weights, measured at the peak of the GPC trace, and commonly referred to as polystyrene equivalent "peak molecular weights," designated as $M_p$. Individual GPC block $M_w$ can be calculated by the difference of $M_p$ measured before and after the considered block polymerization. For example, $M_w$ of block B is the $M_p$ of species A-B minus the $M_p$ of block A.

"Coupling efficiency" refers to the weight of molecules of coupled polymer divided by the weight of molecules of coupled polymer plus the weight of molecules of uncoupled polymer. For example, if a coupling efficiency is 80%, then the polymer will contain 20 wt. % of diblock and 80 wt. % of triblock and multi-arm blocks.

"Elastic," "elastomeric," refers to the ability of a material to stretch by at least 50% without rupture or breakage at a given load, and upon release of the load the elastic material or component exhibits at least 80% recovery (i.e., has less than 20% set) according to the Hysteresis Test.

"Film" refers to a sheet-like, and skin- or membrane-like, material, not having by itself a macroscopically observable fibrous structure, wherein the length and width of the material far exceed the thickness of the material (e.g., 10×, 50×, or even 1000× or more). Films are typically formed from molten polymer resins through processes such as but not limited to extrusion, slot die coating, etc.

The disclosure relates to a styrenic block copolymer (SBC) composition comprising a triblock and a diblock structure. The SBC copolymer having at least 20 wt. % of a diblock structure. The composition is suitable for a film application requiring soft stretch properties even without adding oil. Additional components can be added to the SBC composition, accordingly, forming different end-use applications, e.g., film, adhesive, photocurable (photopolymerizable) printing plate, etc.

Styrenic Block Copolymer (SBC): The SBC comprises a block copolymer having: i) a triblock structure selected from A-B-A', A-B-A, and mixtures thereof, ii) a diblock structure A-B; and optionally iii) a coupled block copolymer structure.

In embodiments, the diblock structure A-B is in an amount of up to 50 wt. %, or 20-50 wt. % or 20-45 wt. %, 20-40 wt. % of the SBC.

In embodiments, the triblock structure is present in an amount of 40-80 wt. %, or 60-80 wt. %, or >40 wt. %, or >50 wt. %, or >60 wt. %, or >70 wt. % or <80 wt. %.

In embodiments, the SBC further comprises a coupled block copolymer structure of $(A\text{-}B)_n\text{-}X$, wherein n≥2, $(A\text{-}B)_m\text{-}X\text{-}(B\text{-}A')_o$, wherein (m+o)≥2 and X is a coupling agent.

In embodiments, the styrenic block copolymer has the diblock and the triblock structure in an amount of >75 wt. %, >80 wt. %, >85 wt. %. or >90 wt. %.

Blocks A and A' are vinyl aromatic blocks having similar or different molecular weights, with styrene as a major component and structurally related vinyl aromatic monomer as a minor component in mixture, which may be optional. In embodiments, the structurally related vinyl aromatic monomer is selected from the group of o-methylstyrene, p-methylstyrene, p-tert-butylstyrene, 2,4-dimethyl styrene, α-methylstyrene, vinylnaphtalene, vinyltoluene, vinylxylene, 1,1-diphenylethylene, or combinations thereof.

In embodiments, each polymer block A and A' has a molecular weight $M_w$ of 8-12 kg/mol, or 9-11 kg/mol, or >8 kg/mol, or <12 kg/mol.

Block B is a conjugated diene block, may comprise any suitable conjugated diene. In embodiments, the conjugated diene is 1,3-butadiene monomer that is substantially pure monomer, or contains minor proportions, e.g., up to 10% by weight, of structurally related conjugated dienes, such as 2,3-dimethyl-1,3-butadiene, 1,3-pentadiene, farnesene, myrcene, isoprene, and 1,3-hexadiene. Alternatively, substantially pure butadiene can be used to prepare the conjugated diene blocks. In embodiments, the conjugated diene block contains a residual coupling agent (X).

In embodiments, the polymer block B is derived from a conjugated diene monomer, wherein at least 90 wt. % of polymer block B is polymerized butadiene monomer.

In embodiments, block B has a vinyl content of 5-20 mol %, or 8-18 mol %, or 10-15 mol %, or >5 mol %, or <20 mol %, based on total polymerized conjugated diene monomer.

In embodiments, the SBC has a vinyl aromatic content (polystyrene content) of 13-28% wt. %, or 17-28 wt. %, or 18-24 wt. %, or 20-25 wt. %, or >17%, or <30%, relative to the overall weight of the SBC.

In embodiments, the SBC has a triblock molecular weight $M_w$ of 100-200 kg/mol, or 115-190 kg/mol, or 130-180 kg/mol, or <200 kg/mol, or >100 kg/mol.

In embodiments, the use of monomers and a coupling agent with 2 or more functional groups result in a SBC composition that is largely linear, e.g., having a $(A\text{-}B)_n\text{-}X$ wherein n≥2, or $(A\text{-}B)_m\text{-}X\text{-}(B\text{-}A')_o$ wherein (m+o)≥2 structure, or mixtures therefrom, with a very small amount (e. g., <15 wt. %, or <10 wt %).

In embodiments, the coupled SBC has a coupling efficiency of 50-80%, or 55-75%, or >50%.

Styrenic Block Copolymer (SBC) Preparation: The block copolymer can be prepared by sequential anionic polymerization of vinyl aromatic and conjugated diene monomers, or via sequential anionic polymerization followed by coupling.

In embodiments of a sequential anionic polymerization, the block copolymer is made by first adding a vinyl aromatic monomer to form a first A block, adding a diene monomer to form a B block, and then adding an additional vinyl aromatic monomer A or A' to form a second vinyl aromatic block. The reaction is carried out with an organo-alkali metal compound as the initiator/catalyst, in a suitable solvent at a temperature from 0-150° C., or 0° C.-120° C., or 30-100° C., or <150° C., or at ambient. Examples of anionic polymerization initiators include organolithium compounds having the general formula $(R\text{-}Li)_n$ where R is an aliphatic, cycloaliphatic, aromatic, or alkyl-substituted aromatic hydrocarbon radical having from 1 to 20 carbon atoms, Li is lithium, and n has a value from 1 to 4. Preferred initiators include n-butyl lithium and sec-butyl lithium.

The polymerization reaction is terminated by an alcohol terminating agent. The triblock copolymer has a A-B-A structure or A-B-A' depending on whether the additional vinyl aromatic is the same or different.

In embodiments with an additional coupled block copolymer having a $(A\text{-}B)_n\text{-}X$ structure, the block copolymer is made by first polymerizing A block and then adding a diene monomer to form a B block. In the next step the resultant diblock "$A\text{-}B\text{-}Li^{+}$" is reacted with a coupling agent to form a coupled block copolymer of the formula $(A\text{-}B)_n\text{-}X$, where n ≥1 and X is coupling agent.

In embodiments with an additional coupled block copolymer having a $(A\text{-}B)_m\text{-}X\text{-}(B\text{-}A')_o$ structure, the block copolymer is made by preparing $(A\text{-}B^{-}Li^{+})$ in a first reactor by polymerizing A followed by addition of a B block. In a separate reactor, $(A'\text{-}B^{-}Li^{+})$ is prepared by polymerizing A' followed by addition of a B block. In the next step, coupling agent is added to the mixture of $(A\text{-}B^{-}Li^{+})$ and $(A'\text{-}B^{-}Li^{+})$ in a single reactor. The resultant product is a coupled block copolymer of the formula $(A\text{-}B)_m\text{-}X\text{-}(B\text{-}A')_o$, where (m+o)≥1 and X being the coupling agent.

The quantity of coupling agent employed with respect to the amount of living polymer A-B-Li+, which largely depends upon the degree of coupling and the properties of the desired coupled polymers. The coupling efficiency and the diblock content after coupling is driven by the ratio between two mole contents, e.g., i) the mole of living chains corresponding to the amount in mole of A-B-Li+, and ii) the mole of reactive sites available within the coupling agent. In embodiments, the ratio between the two mole contents is ranging from 0.08 to 1 mol, or 0.08 to 0.75 mol, or 0.125 to 0.75 mol, or 0.25 to 0.6 mol, or >0.125 mol or <0.75 mol.

The coupling reaction can be at a wide temperature range and often the same as the polymerization temperature, e.g., from 0-150° C., or 30-100° C., or 40-80° C. The coupling reaction is normally carried out by mixing the coupling agent, neat or in solution, with the living polymer solution. The reaction period ranges from 1-90 minutes. After coupling the coupled block copolymer is isolated and characterized.

In embodiments, the coupling agent is selected from di- and multi-functional molecules able to couple living anionic polymers, e.g., methoxysilanes, or halogenated silanes, epoxies, adipates, benzoates, dimethyldimethoxysilane, tetramethoxysilane, dimethyldichlorosilane, methyl trimethoxy silane, di-ethyl-adipate, and mixtures thereof.

Potential Applications: In many applications, the use of the SBC composition eliminates the need for mixing different styrenic block copolymers to obtain the same desired properties, thus simplifying the production process.

In embodiments, the use of the SBC composition in applications such as films obviates the need for the addition of plasticizers, while still providing desired properties as with compositions requiring the addition of plasticizers such as mineral oil. In embodiments of elastic films containing the SBC composition, the films can be used for a wide variety of applications, e.g., disposable absorbent articles requiring soft stretch characteristics to control the movement of liquids and/or to provide a comfortable, conforming fit when the article is worn by a wearer; films for bonding with another substrate including porous substrates; feminine sanitary napkin construction, and adult incontinent brief elastic attachment or side panels, diaper back sheet lamination. The films can also be used in medical applications, e.g., surgical gowns, surgical drape assembly, etc.

For adhesives, the SBC composition can be used as a base polymer for pressure sensitive applications, showing adhesive properties similar to S-I-S polymer, with stable hot-melt viscosities, lower polymer content, and possibilities for higher renewable content.

In other embodiments, the SBC composition is used for flexographic printing plates. In yet other embodiments, the SBC composition is used for bitumen modification, self-adhesive roofing, tie layers, impact modifier for thermoplastics or resins, rubber emulsions, footwear, and elastic fibers.

Depending on the end-use applications, e.g., film, adhesive, photocurable (photopolymerizable) printing plate, etc., additional components can be added to the SBC, accordingly, forming the end-use applications.

Film Applications: In embodiments, the SBC is used for making elastic films, particularly films with a soft stretch. In such embodiments, the film composition comprises, consists essentially of, or consists of the SBC in an amount of up to 98 wt. %, or at least 90 wt. %, or at least 85 wt. %, and up to 2 wt. % of optional additives such as antioxidants.

In some embodiments, in addition to the SBC in amounts of 50-95 wt. %, or 60-85 wt. %, or 65-75 wt. %, the film composition further comprises other polymers, e.g., other styrenic block copolymers can be added to the film composition, e.g., S-B-S (styrene-butadiene-styrene) and/or S-I/B-S (linear or coupled styrene-isoprene/butadiene-styrene) block copolymers can be added in an amount of at least 5 wt. %, or up to 50 wt. %.

In some embodiments, in addition to the SBC, the film composition further contains other polymers such as metallocene polyolefin (m-POE), ethylene/alpha-olefin copolymers, propylene/alpha-olefin copolymers, ethylene/propylene/alpha-olefin terpolymers such as polyolefin plastomers and elastomers, polyethylene and its copolymers, polystyrene, and mixtures thereof. Polystyrene, if present, is selected from resins having melt flow rate of >3 g/10 min, and <38 g/10 min, or 10-30 g/10 min at 200° C./5 kg.

Adhesive Applications: In embodiments, the SBC is for use in an adhesive composition comprising, consisting essentially of, or consisting of SBC in an amount of 5-60 wt. %, or 10-50 wt. %, or at least 15 wt. %, or 20-40 wt. %; a tackifier in an amount of up to 75 wt. %, optional plasticizer in an amount of up to 30 wt. %, and optional additives.

Examples of tackifiers include cycloaliphatic hydrocarbon resins, mixed aromatic and aliphatic modified hydrocarbon resins, aromatic modified aliphatic hydrocarbon resins, and aromatic modified aliphatic hydrocarbon resins (partially) hydrogenated version, modified terpenes, rosin esters and copolymers and terpolymers of natural terpenes (e.g., styrene-terpene, alpha-methyl styrene-terpene, and vinyl toluene-terpene), phenolic-modified terpene resins and combinations thereof. The amount of tackifier ranges from 5-75 wt. %, 5-60 wt. %, or <65 wt. %, or <45 wt. %, or >25 wt. %.

The adhesive composition of the invention may also contain plasticizers in order to provide wetting action and/or viscosity control. Useful plasticizers include mineral oils, saturated hydrocarbons, naphthenic and paraffinic oils, and oils with some aromatic content. Said plasticizers include not only the usual plasticizers but also embrace the use of low molecular weight polymers as well as vegetable and animal oils and their derivatives. The petroleum derived oils which may be employed are relatively high boiling materials and preferably contain only a minor proportion of aromatic hydrocarbons. The oligomers may be low molecular weight polyolefins, polybutylene, or poly(butadiene) polymers. Vegetable and animal oils include glyceryl esters of fatty acids and polymerization products thereof.

In embodiments, in addition to the SBC, the adhesive composition further contains an aromatic resin in an amount of up to 30 wt. %, or 5-25 wt. %, or <20 wt. %, or <10 wt. %, or <5 wt. %, based on the total weight of the composition. Examples of aromatic resins include phenolic resins, polyimides, polybenzimidazoles (PBI), aromatic polyesters.

Printing Plate Applications: In embodiments for printing plate applications, in addition to the SBC in amounts of 20-94.8 wt. %, or 40-93 wt. %, or 70-90 wt. %, or 80-90 wt. %, the photocurable composition further comprises a photoinitiator in an amount of 0.1-10 wt. %, and 2-50 wt. % of a crosslinking agent. In embodiments, the photocurable composition further comprises optional additives, including a plasticizer in amounts of <40 wt. %, or 5-40 wt. %, or 5-20 wt. %, selected from the group of natural oils and resins, mineral oils, and mixtures thereof.

Examples of photoinitiator include methylbenzoin, benzoin acetate, benzophenone, benzil dimethyl-ketal or ethyl anthraquinone/4,4-bis(dimethyl amiano)benzophenone, 1,2-diphenyl-2,2-dimethoxyethanone, or mixtures thereof. In embodiments, the photoinitiator is present in an amount of 0.1-10 wt. %, or 0.2-8 wt. %, or 0.5-6 wt. %, or 1-4 wt. %, or <10 wt. %, or >0.1 wt. % based on the total weight of the photocurable composition.

Examples of cross-linking agents include acrylic cross-linkers, e.g., esters or amides obtained from acrylic acid, methacrylic acid, butyl methacrylate, ethyl methacrylate, glycidyl methacrylate, styrene methacrylate, or allyl methacrylate, and monofunctional or polyfunctional alcohols, amines, amino-alcohols, and hydroxy-ethers or hydroxyesters. The amount of crosslinking agents ranges from 2-50 wt. %, or 2-20 wt. %, or 5-20 wt. %.

Optional Additives: Depending on the application, e.g., films, adhesives, flexographic printing plates, etc., the final composition with the SBC further includes additional components selected from adhesion promoters, ultraviolet light stabilizers, rheology modifiers, biocides, corrosion inhibitors, antiozonants, thermal polymerization inhibitors, dehydrators, colorants (e.g., pigments and dyes), fillers, surfactants, flame retardants, antioxidants, plasticizers, and combinations thereof.

Examples of antioxidants include but are not limited to, e.g., pentaerythritol tetrakis[3,(3,5-di-tert-butyl-4-hydroxyphenyl)propionate], 2,2'-methylene bis(4-methyl-6-tert-butylphenol); phosphites such as tris-nonylphenyl)-phosphite (TNPP), bis(2,4-di-tert-butylphenyl)4,4'-diphenylene-diphosphonite, di-stearyl-3,3'-thiodipropionate (DSTDP), butylated hydroxytoluene (BHT), butylated hydroxyanisole (BHA), tertiary-butylhydroquinone (TBHQ), (2.4-bis-(n-octylthio)-6-(4-hydroxy-3,5-di-tertiary-butyl anilino)-1,3,5-triazine), (tetrakis-ethylene-(3,5-di-tertiary-butyl-4-hydroxy-hydrocinnamate)methane), (Tris(2,4-di-tert-butylphenyl)phosphite), and mixtures thereof.

Optional additives, if present, are in amounts of 0.1-15 wt. %, or 0.5-15 wt. %, or 0.1-12 wt. %, or 1-10 wt. %, or 2-8 wt. %, or >1 wt. %, or >2 wt. %, or <5 wt. %, based on the total weight of the composition forming the end-use application.

Method of Forming End-Use Applications: Film, adhesive and photopolymerizable compositions are formed by homogeneously mixing the components, e.g., the SBC, application components, optional components, and additives sequentially, or in any order using methods known in the art e.g., in solution, in a kneader, compounding in a twin-screw extruder or internal mixer, Z-blade mixer, to get the finished composition.

For making films or layers for use in flexographic printing applications, the finished composition is then cast into an elastomeric film by solvent cast method, extrusion cast or blown and/or compression molding method. In embodiments, the film has a thickness of 500-2500 μm, or 550-2000 μm, or 600-1500 μm, or 750-1000 μm, or >850 μm, or <2500 μm, or >500 μm. For flexographic applications, film layers are produced in appropriate thickness, e.g., 0.5 to 6.5 mm.

Properties: In neat polymer form, the SBC composition provides improved properties suitable for use in high-performance applications, including:

Shore A hardness ranges from 35-75, or 40-68, or 45-60, or 50-55, or >35, or >40, or <75, or <68, measured according to ASTM D 2240.

Melt flow rate of 1-35, or 2-25, or 4-20, or <35, or <25, or >1, or >3, or >5, or >7, or >10 g/10 min, at 200° C. and with a 5 kg load, measured according to ASTM D1238.

The SBC composition exhibits one or more of:

Tensile strength of 5-30 MPa or <25 MPa, or 8-20 MPa, >5 MPa, measured in accordance with ISO 37.

Modulus 100% of 0.5 to 1.8 MPa, or 0.75-1.6 MPa or <2 MPa or >0.2 MPa, measured in accordance with ISO 37.

Elongation at break of >500%, or <1600%, or >600%, or >700%, >800% % >900%, or <1500% or <1400% measured in accordance with ISO37.

The SBC when used in adhesive composition having 35 to 55 wt. % of the tackifier (adhesive composition is coated onto 50 μm PET film at a dry coating weight of 22 g/m$^2$) exhibits one or more of:

Adhesion of 25-0.1 N/25 mm, or <25 N/25 mm, or 20-1 N/25 mm, or 15-5 N/25 mm, or >5 N/25 mm, or >3 N/25 mm, or 2.2 or 1.8 N/25 mm, or 0.5 N/25 mm, or 0.2 N/25 mm, as determined under the 180° peel adhesion test, performed according to Finat Test Method-FTM 1 (300 mm/min)—against HDPE and stainless-steel substrate.

Tack of 0.1-35 N/25 mm, or 1-30 N/25 mm, or 3-25 N/25 mm, or 15-23 N/25 mm, or >0.1 N/25 mm, or <35 N/25 mm, or 23-15 N/25 mm, as determined under the loop tack test performed according to FTM 9 (300 mm/min) against stainless steel substrate.

Static shear resistance of >5, or >10, or >15, or >20 MPa as determined under the holding power test performed according to FTM 8, at room temperature with a 2 kg load and a ½ inch $^2$ contact area.

Melt viscosity of between 15000-150000 cP, or >15000 cP, or <150000 cP, or 25000-120000 cP or >20000 cP measured in accordance with DIN 53019 at 160° C.

SAFT (Temperature resistance) of 50-150° C., or 60-100° C., >55° C., or >60° C., as determined under the Shear Adhesion Failure Temperature (SAFT) test with 1-inch$^2$ contact area, 500 g load and 22° C./h temperature increase. The test determines the temperature at which a pressure sensitive adhesive will fail in shear adhesion when a constant force is applied while the temperature is increased at a constant rate.

When the SBC composition is used in photopolymerizable compositions for making a flexographic printing plate, the layers exhibit a good reactivity during the curing phase and properties such as softness and flexibility after curing. The cured flexographic printing plate is exhibiting adequate chemical and dimensional stability during storage and use.

Examples: The following illustrative examples are intended to be non-limiting. The following test methods are used.

Polymer molecular weights can be determined by gel permeation chromatography (GPC) using polystyrene calibration standards according to ASTM 5296.

Glass transition temperature ($T_g$) is measured by Dynamic Mechanical Analysis (DMA) according to ASTM 4065. Temperature sweep experiments were conducted from −80 to 200° C. with a heating ramp of 2° C./min and at 10 rad/s in the shear mode unless specified otherwise, where storage moduli (G'), loss moduli (G"), and loss factors (tan δ) were obtained as a function of temperature.

Tensile stress strain is measured on solvent cast films according to ISO 37 using dumbbell 2 type specimen and a crosshead displacement speed of 500 mm/min. The same test method and speed is used to test tensile properties of extrusion cast films, using 15 mm wide and 100 mm long strips. Hysteresis is measured on similar strips, elongated to 100% %, immediately relaxed to zero force (unload step). A second cycle is started directly after the first cycle, elongating the strip to a similar extension, then relaxed. A total of 5 cycles are done. The first cycle can be considered as a pre-stretch.

Melt flow rates (MFR) are measured according to ASTM D1238.

The following materials are used in the examples.

Primary Antioxidant (AO1)—a sterically hindered phenolic primary antioxidant.

Secondary Antioxidant (AO2)—tris (2,4-di-tert. -butylphenyl) phosphite.

Hydrocarbon resin tackifier: A C5 resin, e.g., Escorez from Exxon (Piccotac 95 from Synthomer, a material from similar class).

Rosin Ester Tackifier SYLVALITE™ RE100S resin from Kraton Chemical, LLC.

Plasticizer: Nyflex 223 naphthenic oil.

Styrenic block copolymers—Styrene-butadiene-styrene copolymers—SB S1, SBS2, SBS3 (Examples 1-3), styrene-isoprene-styrene copolymers -SIS1, SIS2, SIS3 (Examples 4C-6C), SIS4 (Example 8C), and styrene-butadiene-styrene copolymer—SBS (Example 7C) are all from Kraton Corporation, with structure information and properties as shown in Tables 1 and 2, with SIS1, SIS2, SIS3, SIS4, and SBS compositions are used for comparative examples.

Example 1 (Ex 1): The block copolymer was prepared by anionic polymerization of styrene and then butadiene followed by coupling and killing. A diblock polymer anion, $A\text{-}B^{-}Li^{+}$, was prepared by charging 1217 L of cyclohexane and 68.9 kg of styrene to a reactor. The reactor temperature set temperature was 38° C. 4.6 L of a solution of an approximately 12 wt. % solution of s-butyllithium in cyclohexane was added, and the styrene was allowed to complete polymerization. The molecular weight of the polystyrene produced in this reaction was determined to be 10.2 kg/mol by GPC. 231 kg of butadiene were added at rates to allow the solution temperature to remain around 70° C. A sample collected at the end of the butadiene polymerization had a styrene content of 22 wt. % and a vinyl content of 10 wt. % basis $^1$H NMR. Following the polymerization of the butadiene, 0.32 kg of 1,2-diethoxypropane (DEP) and 0.34 kg of dimethyldimethoxysilane (DMDMS) was added, and the coupling reaction was allowed to proceed for 40 minutes at 67° C. 0.049 kg of methanol was added to terminate the reaction. The polymer was then recovered via hot water coagulation. The final product had a diblock, A-B, content of 21 wt. %, a linear triblock, $(A\text{-}B)_2X$, content of 77 wt. % and a branched species, $(A\text{-}B)_nX$ with n>2, content of about 2 wt. %. The linear triblock had an overall molecular weight $M_w$ of 156 kg/mol as determined by GPC.

Example 2 (Ex 2). Example 1 was repeated, except that the amount of DEP is 0.06 kg, the amount of DMDMS is 0.29 g and 0.098 kg of methanol. The polymer was then recovered via hot water coagulation. The final product had a diblock, A-B, content of 38 wt. %, a linear triblock, $(A\text{-}B)_2X$, content of 57 wt. % and a branched species, $(A\text{-}B)_nX$ with n >2, content of about 5 wt. %. The linear triblock had an overall molecular weight $M_w$ of 157 kg/mol as determined by GPC.

Example 3 (Ex 3): Example 1 was repeated, except that the amount of DEP is 0.08 kg, the amount of DMDMS is 0.31 kg and 0.072 kg of methanol. The polymer was then recovered via hot water coagulation. The final product had a diblock, A-B, content of 29 wt. %, a linear triblock, $(A\text{-}B)_2X$, content of 67 wt. % and a branched species, $(A\text{-}B)_nX$ with n >2, content of about 4 wt. %. The linear triblock had an overall molecular weight $M_w$ of 153 kg/mol as determined by GPC.

Examples (Ex.) 1-3 and 4C-7C (Extrusion Cast Films): Elastomeric film samples were made by melt casting the polymers described in Table 1. Blends of the block copolymers and 0.25 wt. % of AO1 and 0.25 wt. % of AO2 were prepared and mixed for 15 minutes in a tumbler. The pre-blends were fed into a Göttfert Extrusiometer P extruder equipped with a 25 mm single screw extruder and a 150 mm wide flat film die. A melt temperature of 200° C., screw speed of 25 rpm and take off speed of 0.6 m/min., were used for the preparation of the extrusion cast films. The films obtained have a thickness of 400-450 μm.

TABLE 1

| Ex. | Main structure | Diblock structure | Diblock Content, wt. % | Triblock Content, wt. % | A block Mo kg mol | Bd content in B, wt. % | Vinyl content in B, wt. % | PS Content, wt. % | MFR (200° C./5 kg), g/10 min | Hardness Shore A (10 sec) |
|---|---|---|---|---|---|---|---|---|---|---|
| Ex 1 | A-B-A | A-B | 21 | 77 | 10.2 | 100 | 10 | 22 | 7 | 62 |
| Ex 2 | A-B-A | A-B | 38 | 57 | 10.2 | 100 | 10 | 22 | 10 | 58 |
| Ex 3 | A-B-A | A-B | 29 | 67 | 10.1 | 100 | 10 | 23 | 7 | 63 |
| Ex 4C | A-Ip-A' | A-Ip | <1 | | — | 0 | 7 | 19 | 9 | 42 |
| Ex 5C | A-Ip-A | A-Ip | 33 | | — | 0 | 7 | 17 | 27 | 33 |
| Ex 6C | A-Ip-A' | A-Ip | <1 | | — | 0 | 7 | 29 | 12 | 53 |
| Ex 7C | A-B-A' | A-B | <1 | >95 | — | 100 | 8 | 30 | 5 | 70 |
| Ex 8C | A-Ip-A' | A-Ip | 18 | | — | 0 | 7 | 15 | 12 | 32 |

PS-polystyrene, A-polystyrene block, B-polybutadiene block, Ip-polyisoprene block, C-comparative

TABLE 2

Properties of Neat Polymer (measured on solvent cast films)

| Examples | Tensile Strength (MPa) | Elongation at break (%) | Modulus 100% (MPa) | Modulus 300% (MPa) |
|---|---|---|---|---|
| Ex 1 | 13.4 | 1000 | 1.6 | 2.6 |
| Ex 2 | 12.8 | 1275 | 1.3 | 2.0 |
| Ex 3 | 14.0 | 985 | 1.4 | 2.2 |
| Ex 8C | 19 | 1500 | 0.8 | 1.3 |

Table 2 above shows the properties of solvent cast films prepared by placing polymer/toluene mixtures overnight on a roller bench till complete dissolution of the polymers, pouring the solutions in a silicone tray of 10×10 cm. The toluene was allowed to evaporate for 3 days. Prior to testing, the films were turned over and dried for 3 more days at room temperature and 1 night in the vacuum oven at 40° C. to remove all residual toluene. The solvent cast films have a thickness of 1000-1500 μm.

Table 3 below shows properties of the films including tensile properties and hysteresis measured on 400-450 μm extrusion cast film. Examples 1 to 3 with the SBC composition exhibit low retention forces at 100% elongation (so called soft stretch) of the same order of magnitude as compared obtained with the examples 4C-6C (SIS1-SIS3). The values are significantly lower in comparison to example 7C (SBS). In addition to soft stretch properties (as illustrated with low modulus 100%), the films based on examples 1-3 have good/reasonable tensile strength (>8 MPa), high elongation at break values and good hysteresis properties, especially when an activation step (one cycle of pre-stretching) is performed. The properties of the films for the examples 1-3 are also close to isotropic at low elongations, which is not the case for comparative example 7C.

TABLE 3

(MD is machine direction and TD is transverse direction).

| Examples (Ex) Chemistry | Ex 1 SBS1 | | Ex 2 SBS2 | | Ex 3 SBS3 | | Ex 4C SIS1 | | Ex 5C SIS2 | | Ex 6C SIS3 | | Ex 7C SBS | |
|---|---|---|---|---|---|---|---|---|---|---|---|---|---|---|
| Tensile properties | MD | TD | MD | TD | MD | TD | MD | TD | MD | TD | MD | TD | MD | TD |
| Modulus 100% (MPa) | 1.2 | 1.2 | 1.0 | 0.8 | 1.1 | 0.9 | 0.9 | 0.7 | 0.5 | 0.5 | 2.7 | 1.0 | 2.9 | 1.9 |
| Modulus 300% (MPa) | 1.3 | 1.6 | 1.2 | 1.1 | 1.4 | 1.2 | 1.4 | 1.1 | 0.7 | 0.7 | 3.5 | 1.5 | 3.8 | 2.4 |
| Tensile strength (MPa) | 10 | 10 | 14 | 15 | 18 | 12 | 24 | 24 | 9 | 9 | 24 | 21 | 13 | 13 |
| Elsagation at break (%) | 925 | 905 | 1415 | 1470 | 1260 | 1050 | 1565 | 1640 | 1460 | 1440 | 1535 | 1245 | 780 | 780 |
| Hysteresis at 100% elongation | MD | TD | MD | TD | MD | TD | MD | TD | MD | TD | MD | TD | MD | TD |
| Set after 1 cycle (%) | 12 | 10 | 16 | 11 | 12 | 9 | 5 | 4 | 9 | 9 | 8 | 4 | 11 | 5 |
| Set after 5 cycles (%) | 16 | 15 | 22 | 16 | 16 | 14 | 7 | 6 | 12 | 12 | 9 | 5 | 14 | 7 |

TABLE 4

| Components | Formulation 1 (low $T_g$) | Formulation 2 (high $T_g$) | Formulation 3 (low $T_g$) | Formulation 4 (high $T_g$) | Formulation 5 (low $T_g$) | Formulation 6 | Formulation 7 |
|---|---|---|---|---|---|---|---|
| Ex 1 | 100 | 100 | — | — | — | — | — |
| Ex 2 | — | — | 100 | 100 | — | — | — |
| Ex 3 | — | — | — | — | 100 | — | — |
| Ex 8C | — | — | — | — | — | 100 | 100 |
| resin ester tackifier | 150 | 180 | 150 | 180 | 150 | 125 | — |
| C5 resin tackifier | — | — | — | — | — | — | 125 |
| Plasticizer | 40 | 20 | 40 | 20 | 40 | 25 | 25 |
| Antioxidant (AO) 1 | 2 | 2 | 2 | 2 | 2 | 2 | 2 |
| Antioxidant (AQ) 2 | 1 | 1 | 1 | 1 | 1 | 1 | 1 |
| Polymer Content % | 34.5 | 33.3 | 34.5 | 33.3 | 34.5 | 40.0 | 40.0 |
| Calculated $T_g$ | −12 | 1 | −12 | 1 | −12 | 4 | 1 |

Formulations 1-4—Adhesive Composition: The adhesive compositions were hot-melt compounded in a mini-Z blade mixer, then dissolved in toluene prior to solvent coating at a dry coating weight of 22±2 g/m$^2$ (after evaporation of solvent). Formulations are shown in Table 4 above. The properties with low SBS content in formulation 1-5 are comparable to the properties of the comparative formulations 6 and 7.

TABLE 5

| Formulations | Peel Adhesion on HDPE (N/25 mm) | Peel Adhesion on stainless steel (N/25 mm) | Holding Power on SS (h) | HMV @160° C. (cP) | HMV retention @160° C. after 24 hrs (%) | SAFT (° C.) | Rolling back tack (cm) | Looptack on stainless steel (N/25 mm) |
|---|---|---|---|---|---|---|---|---|
| Formulation 1 | 7 | 15 | 27 | 57200 | 82 | 69 | 1 | 16 |
| Formulation 2 | 2 | 16 | 25 | 75200 | 91 | 71 | 25 | 1 |
| Formulation 3 | 8 | 15.5 | 10 | 34600 | 76 | 61 | 1 | 20 |
| Formulation 4 | 0.5 | 16 | 10 | 45000 | 89 | 65 | 25 | 1 |
| Formulation 5 | 9 | 17 | 14 | 41000 | 84 | 65 | 1 | 19 |
| Formulation 6 | 9 | 16 | 15 | 61100 | 25 | 71 | 0.1 | 20 |
| Formulation 7 | 11 | 19 | 50 | 86200 | 65 | 99 | 0.5 | 22 |

Table 5 shows results of tests performed on the formulations 1-7, including 180° peel adhesion (180° angle) conducted on HDPE and stainless-steel substrate, loop tack and holding power (static shear) conducted on stainless steel substrate, and hot-melt viscosity (HMV) at 160° C. HMV for the SBS based formulations 1-5 remains significantly more stable than the SIS based formulations 6-7 (with HMV@160° C. being relatively high of 86,300 cP for formulation 7, and HMV retention after 24 hours of 25% for formulation 6).

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. the recitation of a genus of elements, materials, or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A styrenic block copolymer comprising based on the total weight of the styrenic block copolymer:

(i) a diblock structure of A-B, in an amount of 20-50 wt. %;

(ii) a triblock structure selected from A-B-A', A-B-A, and mixtures thereof, in an amount of 40-80 wt. %;

wherein:

each polymer block A and A' is same or different, derived from a vinyl aromatic monomer, and each block has a molecular weight of 8-12 kg/mol; and polymer block B contains more than 90 wt. % polymerized butadiene monomer and polymer block B has a vinyl content of 5-20 mol %;

the styrenic block copolymer has a polystyrene content of 17-28 wt. %; and wherein the styrenic block copolymer is characterized as having;

a melt flow rate of 1-35 g/10 min at 200° C./5 kg, measured according to ASTM D1238; and a Shore A hardness of 35-75, measured according to ASTM D 2240.

2. The styrenic block copolymer of claim 1, wherein the styrenic block copolymer further comprises up to 15 wt. % of at least a structure selected from $(A-B)_n$-X or $(A-B)_m$-X-$(B-A')_o$, and mixtures thereof, wherein n and (m+o) ≥2 and X is a residue of the coupling agent.

3. The styrenic block copolymer of claim 2, wherein total amount of the diblock and the triblock structure in the styrenic block copolymer is greater than 90 wt. %.

4. The styrenic block copolymer of claim 2, wherein the coupling agent X is selected from the group of methoxysilanes, halogenated silanes, epoxies, adipates, benzoates, dimethyldimethoxysilane, dimethyldichlorosilane, di-ethyladipate, and mixtures thereof.

5. The styrenic block copolymer of claim 2, wherein the styrenic block copolymer has a coupling efficiency of 50-80%.

6. The styrenic block copolymer of claim 1, wherein the styrenic block copolymer is characterized as having at least one of: a modulus at 100% of 0.5 to 1.8 MPa, an elongation at break of >800%, and a tensile strength of >8 MPa, all properties according to ISO 37.

7. A film composition comprising:

the styrenic block copolymer of claim 1, in an amount of 50-98 wt. % relative to the overall weight of the film composition;

at least one antioxidant, in an amount of 0.1-2 wt. %;

an optional component in an amount of 0-30 wt. %; and a plasticizer in an amount of 0-30 wt. %;

wherein the optional component is any of a polyolefin, a polyethylene, a polystyrene, and mixtures thereof.

8. The film composition of claim 7, wherein the plasticizer is selected from the group of mineral oil, saturated hydrocarbons, naphthenic and paraffinic oils, oils with some aromatic content, and mixtures thereof.

9. The film composition of claim 7, wherein the plasticizer is present in an amount of less than 5%.

10. The film composition of claim 7, wherein the plasticizer is present in an amount of less than 1%.

11. The film composition of claim 7, for use in any of baby diapers, adult incontinent brief elastic attachment and side panels, surgical gowns, drapes, and industrial filter material.

12. An adhesive composition comprising:

the styrenic block copolymer of claim 1, in an amount of 5-50 wt. % relative to the overall weight of the adhesive composition;

a tackifier in an amount of 5-70 wt. %;

an optional aromatic resin in an amount of 0-30 wt. %;

an optional component in an amount of 0-30 wt. %;

at least one antioxidant, in an amount of 0.1-2 wt. %; and a plasticizer in an amount of less than 30 wt. %.

13. The adhesive composition of claim 12, wherein the tackifier is selected from the group of hydrogenated $C_5$ hydrocarbon resins, hydrogenated $C_9$ hydrocarbon resins, $C_5/C_9$ hydrocarbon resin, a modified $C_5$, $C_9$ or $C_5/C_9$ resin, styrenated terpenes, terpene phenols, rosin ester, rosin derivatives, and a mixture of two or more of these.

14. The adhesive composition of claim 12, wherein the plasticizer is selected from the group of mineral oil, saturated hydrocarbons, naphthenic and paraffinic oils, oils with some aromatic content, and mixtures thereof.

15. The adhesive composition of claim 12, for use in diapers, napkin core stabilization or diaper back sheet lamination and in any pressure-sensitive adhesive composition like tapes and labels.

16. The adhesive composition of claim 12 characterized as having at least one of:

an adhesion (N/25mm) against HDPE and stainless-steel substrate of 25-0.1 according to FTM 1;

a tack (N/25 mm) against stainless-steel substrate of 0.1-35 according to FTM 9; and a Shear Adhesion Failure Temperature (SAFT) of 55-150° C.

17. A photopolymerizable composition comprising:

the styrenic block copolymer of claim 1, in an amount of 20-94.8 wt. % relative to the overall weight of the photopolymerizable composition;

a crosslinking agent in an amount of 5-50%;

a photoinitiator in an amount of 0.1-10 wt. %;

an additive in an amount of 0.1-15 wt. %; and a plasticizer in an amount of 0-40 wt. %; wherein the plasticizer is selected from the group of mineral oil, saturated hydrocarbons, naphthenic and paraffinic oils, oils with some aromatic content, and mixtures thereof.

18. The photopolymerizable composition of claim 17, wherein the crosslinking agent is selected from the group of esters or amides obtained from acrylic acid, methacrylic acid, butyl methacrylate, ethyl methacrylate, glycidyl methacrylate, styrene methacrylate, or allyl methacrylate, and monofunctional or polyfunctional alcohols, amines, aminoalcohols, and hydroxy-ethers or hydroxyesters, and mixtures thereof.

19. The photopolymerizable composition of claim 17, wherein the photoinitiator is selected from the group of methylbenzoin, benzoin acetate, benzophenone, benzil dimethyl-ketal or ethyl anthraquinone/4,4-bis(dimethyl amiano) benzo-phenone, 1,2-diphenyl-2,2-dimethoxyethanone, and mixtures thereof.

20. The styrenic block copolymer of claim 1, for use in bitumen modification, self-adhesive roofing, tie layers, impact modification of thermoplastics and resins, rubber emulsions, footwear, and elastic fibers applications.

* * * * *